US012792435B2

(12) United States Patent
Bajek

(10) Patent No.: US 12,792,435 B2
(45) Date of Patent: Nov. 10, 2026

(54) COMPUTER-BASED SYSTEMS CONFIGURED TO ORCHESTRATE A TRANSFER OF A DATA OBJECT AND METHODS OF USE THEREOF

(71) Applicant: Broadridge Financial Solutions, Inc., Lake Success, NY (US)

(72) Inventor: Lawrence Bajek, Jersey City, NJ (US)

(73) Assignee: Broadridge Financial Solutions, Inc., Lake Success, NY (US)

( * ) Notice: Subject to any disclaimer, the term of this patent is extended or adjusted under 35 U.S.C. 154(b) by 0 days.

(21) Appl. No.: 19/568,408

(22) Filed: Mar. 16, 2026

(65) Prior Publication Data

US 2026/0277717 A1 Sep. 17, 2026

Related U.S. Application Data

(60) Provisional application No. 63/772,123, filed on Mar. 14, 2025.

(51) Int. Cl.

*G06F 9/54* (2006.01)
*G06F 16/36* (2019.01)
*H04L 67/60* (2022.01)

(52) U.S. Cl.

CPC ............ *G06F 9/547* (2013.01); *G06F 16/367* (2019.01); *H04L 67/60* (2022.05)

(58) Field of Classification Search

None

See application file for complete search history.

(56) References Cited

U.S. PATENT DOCUMENTS 10,699,010 B2 * 6/2020 Subbarayan .......... G06F 21/552
2023/0318930 A1 * 10/2023 Yarabolu ................ H04L 67/51 709/203
2025/0284727 A1 * 9/2025 Halimi .................. G06F 16/367

* cited by examiner

*Primary Examiner* — Chat C Do
*Assistant Examiner* — William C Wood
(74) *Attorney, Agent, or Firm* — GREENBERG TRAURIG, LLP

(57) ABSTRACT

In some embodiments, the present disclosure provides an exemplary method that may include steps of receiving a request for data communication from an external entity to a particular internal enterprise system; identifying the distinct internal system-specific data ontology associated with the particular internal enterprise system; utilizing a machine learning matrix to dynamically compare the request for the data communication to the distinct internal system-specific data ontology; generating a standardized data ontology; verifying the plurality of protocols associated with the standardized data ontology; generating a standardized application programming interface between the external entity and the particular internal enterprise system; and utilizing an adapter to orchestrate a transfer of a data object from the particular internal enterprise system to the external entity.

19 Claims, 7 Drawing Sheets

COMPUTER-BASED SYSTEMS CONFIGURED TO ORCHESTRATE A TRANSFER OF A DATA OBJECT AND METHODS OF USE THEREOF

FIELD OF TECHNOLOGY

The present disclosure generally relates to computer-based systems configured to orchestrate a transfer of a digital artifact and methods of use thereof.

BACKGROUND OF TECHNOLOGY

Typically, an application programming interface is a way for two or more computer programs or components to communicate with each other. It is a type of software interface, offering a service to other pieces of software. A document or standard that describes how to build or use such a connection or interface is a called an API specification. Generally, a set of rules or protocols that enables software applications to communicate with each other to exchange data, features, and functionality.

SUMMARY OF DESCRIBED SUBJECT MATTER

In some embodiments, the present disclosure provides an exemplary technically improved computer-based method that includes at least the following steps: receiving, by the processor, a request for data communication from an external entity to a particular internal enterprise system of a plurality of internal enterprise systems; identifying, by the processor, the distinct internal system-specific data ontology of the particular internal enterprise system; utilizing, by the processor, a machine learning matrix to dynamically compare the request for the data communication to the data ontology; generating, by the processor, standardized data ontology based on a plurality of protocols associated with a result of the machine learning matrix, where the plurality of protocols associated with the standardized data ontology comprise requirements to connect the external entity with the particular internal enterprise system; verifying, by the processor, the plurality of protocols associated with the standardized data ontology, where verifying the plurality of protocols comprising ensuring a number of shared requirements from the particular internal enterprise system exceed a predetermined threshold; generating, by the processor, a standardized application programming interface between the external entity and the particular internal enterprise system based on the plurality of protocols and the result of the machine learning matrix; and utilizing, by the processor, an adapter to orchestrate a transfer of a data object from the particular internal enterprise system to the external entity via the standardized application programming interface.

In some embodiments, a non-transitory computer-readable storage medium tangibly encoded with computer-executable instructions, that when executed by a device, perform a method including: receiving, by the processor, a request for data communication from an external entity to a particular internal enterprise system of a plurality of internal enterprise systems; identifying, by the processor, the distinct internal system-specific data ontology of the particular internal enterprise system; utilizing, by the processor, a machine learning matrix to dynamically compare the request for the data communication to the data ontology; generating, by the processor, standardized data ontology based on a plurality of protocols associated with a result of the machine learning matrix, where the plurality of protocols associated with the standardized data ontology comprise requirements to connect the external entity with the particular internal enterprise system; verifying, by the processor, the plurality of protocols associated with the standardized data ontology, where verifying the plurality of protocols comprising ensuring a number of shared requirements from the particular internal enterprise system exceed a predetermined threshold; generating, by the processor, a standardized application programming interface between the external entity and the particular internal enterprise system based on the plurality of protocols and the result of the machine learning matrix; and utilizing, by the processor, an adapter to orchestrate a transfer of a data object from the particular internal enterprise system to the external entity via the standardized application programming interface.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
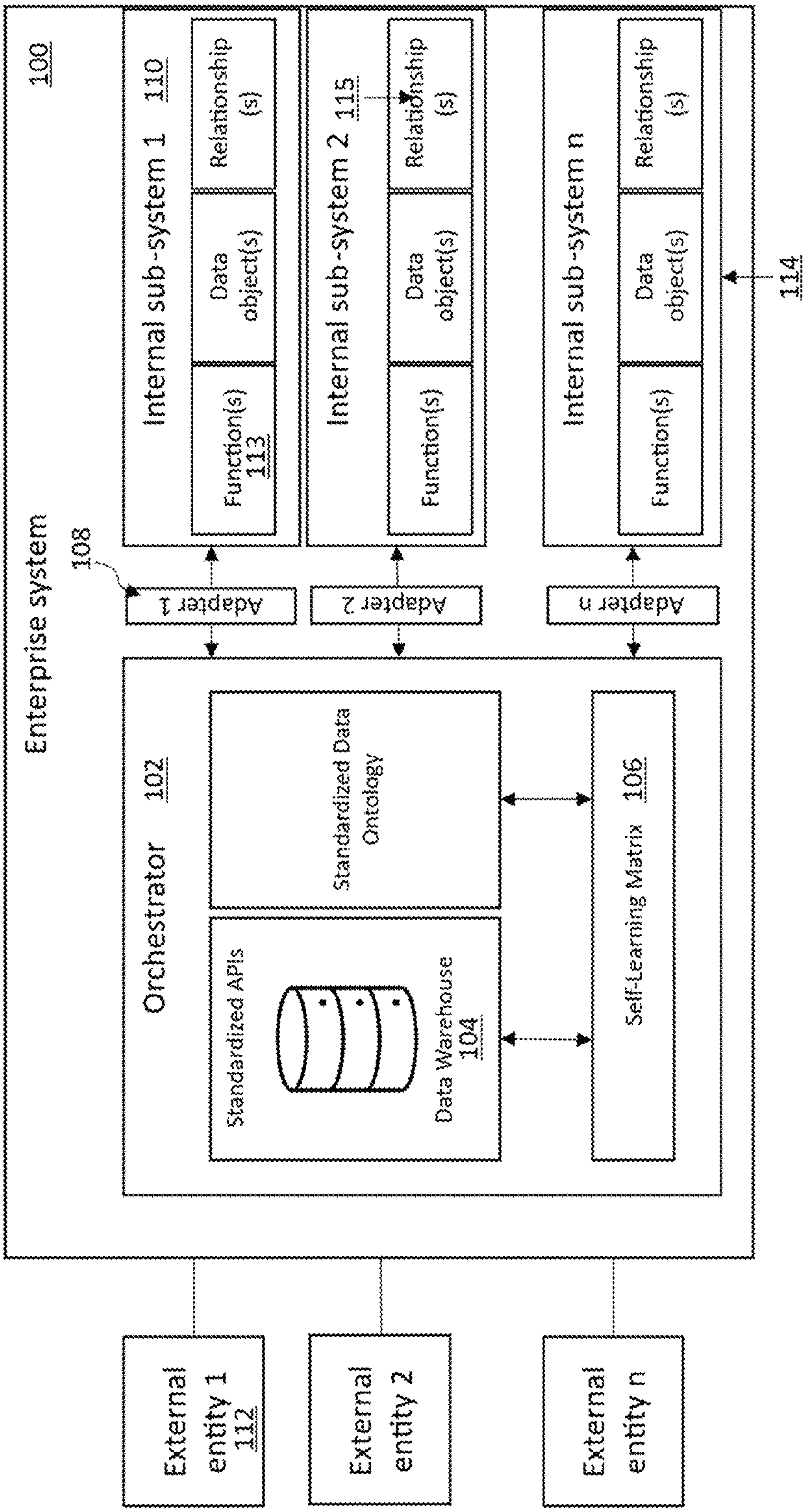
FIG. 1 depicts a block diagram of an exemplary computer-based system and platform for utilizing an adapter to orchestrate a transfer of a data object from a particular internal enterprise system to the external entity via a standardized application programming interface, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments and techniques detailed herein relate to systems and methods for receiving, by a processor, a request for data communication from an external entity to a particular internal enterprise system of a plurality of internal enterprise systems, each internal enterprise system being configured to employ a distinct internal system-specific data ontology; identifying, by a processor, the distinct internal system-specific data ontology of the particular internal enterprise system within a data warehouse; utilizing, by the processor, a machine learning matrix to dynamically compare the request for the data communication to the distinct internal system-specific data ontology; generating, by the processor, standardized data ontology based on a plurality of protocols associated with a result of the machine learning matrix, wherein the plurality of protocols associated with the standardized data ontology comprise requirements to connect the external entity with the particular internal system; verifying, by the processor, the plurality of protocols associated with the standardized data ontology, wherein verifying the plurality of protocols comprising ensuring a number of shared requirements from the particular internal enterprise system exceed a predetermined threshold; generating, by the processor, a standardized application programming interface between the external entity and the particular internal enterprise system based on the plurality of protocols and the result of the machine learning matrix; and utilizing, by the processor, an adapter to orchestrate a transfer of a data object from the particular internal enterprise system to the external entity via the standardized application programming interface.

At least some embodiments of the present disclosure provide technological solution(s) to at least one technological computer-centered problem associated with connecting an external source with an internal enterprise system via an interface. An illustrative technological computer-centered problem associated with connecting the external source to a particular internal enterprise system typically requires a separate interface for each connection via an application processing interface ("API"). The problem further may arise when these connections between the external source and the particular internal enterprise system contain differing rules and/or protocols, as this further requires a separate interface to be generated due to the differing rules and/or protocols. Moreover, these rules and protocols may be stored in a data ontology within a data warehouse, but the data ontology is usually specific to the connection between the external entity and the internal enterprise system. For example, different software applications may each utilize bespoke technical infrastructure, including data ontologies, formats, APIs, domain-specific rules, configurations and logic, among other software application-specific hardware and/or software infrastructure. However, end users may desire and/or need to interact with multiple software applications for a given task and/or improved user experience. Thus, an end user may need to interface with each software application separately and individually using the software application-specific infrastructure.

As detailed in at least some embodiments herein, at least one technological computer-centered solution associated with the illustrative technological computer-centered problem may include generating a standardized data ontology based on a plurality of protocols associated with a plurality of interface systems and generating a standardized API capable of connecting the external entity with a plurality of internal enterprise systems in real-time. In some embodiments, the at least one technological computer-centered solution associated with the illustrative technological computer-centered problem may include identifying a distinct internal system-specific data ontology of the particular internal enterprise system within a data warehouse. In some embodiments, at least one technological computer-centered solution associated with the illustrative technological computer-centered problem may include receiving a request for data communication from the external entity to a particular internal enterprise system. In some embodiments, at least one technological computer-centered solution associated with the illustrative technological computer-centered problem may include utilizing a machine learning matrix to dynamically compare the request for the data communication to the stored data oncology. In some embodiments, at least one technological computer-centered solution associated with the illustrative technological computer-centered problem may include generating the standardized data ontology based on the plurality of protocols associated with a result of the machine learning matrix capable of communicating with the data ontology and an exemplary interface, where the protocols may refer to a plurality of requirements to connect the external entity with the plurality of internal enterprise systems. In some embodiments, at least one technological computer-centered solution associated with the illustrative technological computer-centered problem may include verifying the plurality of protocols associated with the standardized data oncology, where the verification may refer to ensuring a number of shared requirements from the plurality of internal enterprise systems meet a predetermined threshold of similarity. In some embodiments, at least one technological computer-centered solution associated with the illustrative technological computer-centered problem may include generating a standardized application programming interface between the external entity and the plurality of internal enterprise systems based on the plurality of protocols and the result of the machine learning matrix. In some embodiments, at least one technological computer-centered solution associated with the illustrative technological computer-centered problem may include utilizing at least one adapter to orchestrate a transfer of a data object from the plurality of internal enterprise systems to the external entity via the standardized API.

FIG. 1 depicts a block diagram of an exemplary computer-based system and platform for utilizing an adapter to orchestrate a transfer of a data object from a particular internal enterprise system to the external entity via a standardized application programming interface, in accordance with one or more embodiments of the present disclosure.

In some embodiments, an illustrative enterprise system 100 of the present disclosure may include an illustrative orchestration module 102 capable of communicating with a data warehouse 104, a machine learning matrix 106, an adapter 108, an internal enterprise system 110, and an external entity 112. In some embodiments, the illustrative orchestration module 102 may generate standardized APIs and generate standardized data ontology based on receiving request for communications from the external entity 112 to connect with the internal enterprise system 110. In some embodiments, the illustrative enterprise system 110 may be stored on a computing device associated with an individual and a program engine. In certain embodiments, the program engine may be stored on the computing device, which may include a processor, a non-transitory memory, a communication circuitry for communicating over a communication network, and input and/or output (I/O) devices such as a keyboard, a mouse, a touchscreen, and/or a display. In some embodiments, the computing device may refer to at least one communication-enabled computing device of a plurality of communication-enabled computing devices.

In some embodiments, the program engine may be configured to instruct the processor to execute one or more software modules such as, without limitation, an exemplary orchestration module 102, a machine learning matric 106, and/or a data output module 122.

In some embodiments, the exemplary orchestration module 102 of the present disclosure may utilize at least one machine learning algorithm, described herein, to identify a distinct internal system-specific data ontology of the particular internal enterprise system 110 within a data warehouse 104. In certain embodiments, the data ontology may refer to a collection of protocols and rules associated with each external entity and each internal enterprise system. In certain embodiments, the at least one machine learning algorithm may refer to a data model used to identify the system-specific data ontology of data during a period of code generation, as one or more data fields are known values during the period of code generation. In certain embodiments, the data warehouse 104 may refer to an external computing device capable of storing the data ontology and communicating with the illustrative orchestration module 102. In some embodiments, the orchestration module 102 may receive a request from the external entity 112 to communicate with the internal enterprise system 110 of a plurality of internal enterprise systems. In certain embodiments, each internal system 110 may be configured to employ a distinct internal system-specific data ontology. In certain embodiments, the communication may refer to a transfer of a data object between the external entity 112 and the internal enterprise system 110. In some embodiments, the orchestration module 102 may utilize the machine learning matrix 106 to dynamically compare the request for the transfer of the data object within the communication within the distinct internal system-specific data oncology. In certain embodiments, the machine learning matrix 106 may refer to a self-learning matrix. In certain embodiments, the comparison may refer to an analysis of a historical data ontology associated with previous communications between the external entity 112 and the internal enterprise system 110 and a current data ontology identified within the data warehouse 104. In some embodiments, the orchestration module 102 may build an adapter at code development time prior to code packaging and deployment, where the adapter facilities the communication between one or more internal systems and one or external entities. In certain embodiments, the orchestration module 102 may utilize generated code to identify one or more errors in newly received data not designed to be mapped.

In some embodiments, the orchestration module 102 may generate a standardized data ontology based on the plurality of protocols associated with a result of the machine learning matrix 106. In certain embodiments, the standardized data ontology may refer to a data ontology that merges the historical data ontology with the current data ontology and filters any rules and/or protocols that fail to find a match between either data oncology. In certain embodiments, the orchestration module 102 may generate the standardized data ontology (e.g., a dictionary of terms) based on a plurality of values (e.g., JSON fields of input data) associated with a result of an artificial intelligence module. In certain embodiments, the standardized data ontology may be utilized to train one or more models for subsequent mapping processes. In certain embodiments, the orchestration module 102 may calculate a confidence score for a comparison between at least one similarity search and a large language model-based mapping (i.e., LLM mapping) of the plurality of values based on the standardized data ontology. In certain embodiments, the orchestration module 102 may compare the confidence score of a particular comparison to a predetermined threshold associated with a successful matching between the LLM mapping and the at least one similarity search for optimized training of the artificial intelligence module. In certain embodiments, the orchestration module 102 may utilize a plurality of feedback loops (e.g., error process) to indicate an unsuccessful matching between the LLM mapping and the at least one similarity search for optimized training of the artificial intelligence module. In certain embodiments, the orchestration module 102 may utilize the artificial intelligence module to identify one or more actions to enhance the standardized data ontology with additional mapping information. In some embodiments, the orchestration module 102 may identify the one or more errors within the plurality of feedback to generate new code for subsequent deployment.

In some embodiments, the orchestration module 102 may verify the plurality of protocols associated with the standardized data ontology. In certain embodiments, the verification may refer to ensuring a number of shared requirements from the internal enterprise system 110 meet and/or exceed a predetermined threshold of similarity with the requirements of the external entity 112. In certain embodiments, the predetermined threshold of similarity may refer to a level of similarity needed to verify that the standardized data ontology accurately merges the historical data ontology and the current data ontology associated with the external entity 112. The level of similarity may refer to a determination via a similarity measurement algorithm that assigns a value to each parameter associated with the shared number requirements for verification and aggregates the assigned values to establish a similarity threshold for subsequent reference. In some embodiments, the orchestration module 102 may generate a standardized API between the external entity 112 and the internal enterprise system 110 based on the plurality of the protocols and the result of the machine learning matrix 106.

In some embodiments, the orchestration module 102 may utilize an adapter 108 to orchestrate a transfer of a data object 114 for the internal enterprise system 110 to the external entity 112 via the standardized API. In certain embodiments, the internal enterprise system 110 may communicate with a plurality of internal enterprise systems, where each internal enterprise system 110 may contain one or more functions 113, one or more data objects 114, and one or more relationships 115. The one or more functions 113 may include the capabilities of the internal enterprise system 110. The one or more data objects 114 may refer to a plurality of financial positions to support multiple unique processes. Examples of these multiple unique processes may include corporate actions election, proxy voting, capital markets trading, and wealth management. The one or more relationships 115 may refer to the capability of the of each internal enterprise system 110 being able to communicate with the plurality of internal enterprise systems and each external entity 112 in a plurality of external entities.

In some embodiments, the orchestration module 102 may refer to a single data gateway tool that provides a single definition of data stored within the standardized data ontology. In some embodiments, the single data gateway tool may provide the single definition across a plurality of systems and may serve as a gateway to access multiple data services in an orchestrated way. For example, the single data gateway tool may normalize the data within the data ontology associated with the data object 114 subject to transfer via the orchestration module 102 to the external entity 112. In certain embodiments, the single data gateway tool may provide mapping and routing of subsequently an artificial intelligence semantic model. In some embodiments, the orchestration module 102 may utilize the standardized API to leverage one or more API capabilities to address security, monitor and manage traffic within the transfer of data objects 114, and provide analytics to verify consistency between the plurality of internal enterprise systems and the plurality of entities. In some embodiments, the orchestration module 102 may identify one or more data types and locations for the transfer of the data object 114 may include discrete artifacts associated with exceptions resulting from a plurality of data interactions related to the one or more relationships 115 of the internal enterprise system 110. In some embodiments, the orchestration module 102 may utilize the standardized data ontology to provide the transfer of the data object 114 to external systems and/or internal enterprise systems.

In some embodiments, the orchestration module 102 may generate a notification detailing the transfer of the data object 114 from the internal enterprise system 110 to the external entity 112. In some embodiments, the orchestration module 102 may utilize a notification hub to generate the notification providing the one or more artifacts associates with the transferrable data object 114. In certain embodiments, the orchestration module 102 may provide a plurality of continuous notifications that inform the external entity 112 of one or more modifications to the standardized data ontology via a message-streaming component. In some embodiments, the orchestration module 102 may determine which system should process an incoming message based on received input data and pre-stored information about each downstream system (i.e., external entities).

In some embodiments, the orchestration module 102 may utilize an illustrative data translation layer to digitally trace the plurality of continuous notifications outputted by the notification hub and implement a plurality of data control associated with the internal enterprise system 110. In some embodiments, the orchestration module 102 may periodically update the standardized data ontology using a middleware layer that limits subsequent testing requiring for subsequent modification of the standardized data ontology. In certain embodiments, the middleware layer may refer to a method of transferring data to and/or from the external entity 112. In certain embodiments, the middleware layer may refer to a backend layer of the standardized API(s) capable of supporting the performance and reliability of the enterprise system 100. In certain embodiments, the middleware layer may refer a part of the orchestration module 102 that orchestrates and executes business logic and data management, which may include managing and/or routing requests.

In certain embodiments, the machine learning matrix 106 associated with the orchestration module 102 may dynamically compare the request for the data communication to the data ontology stored within the data warehouse 104. In some embodiments, the machine learning matrix 106 may generate the standardized data ontology based on a plurality of protocols associated with the data ontology stored within the data warehouse 104. In certain embodiments, the plurality of protocols associated with the standardized data ontology may refer to a plurality of requirements needed to connect the external entity 112 with the particular internal enterprise system 110. In some embodiments, the machine learning matrix 106 may verify the plurality of protocols associated with the standardized data ontology, where the verification ensures a number of shared requirements from the particular internal enterprise system 110 meet and/or exceed a predetermined threshold of similarity. In some embodiments, the machine learning matrix 106 may generate a standardized application programming interface between the external entity 112 and the particular internal enterprise system 110 based on the plurality of protocols. In some embodiments, the machine learning matrix 106 may utilize an adapter 108 to orchestrate a transfer of a data object 114 from the particular internal enterprise system 110 to the external entity 112 via the standardized application programming interface. In certain embodiments, the data warehouse 104 may not be required for any transfers of the data object 114 associated with the orchestration module 102. For example, the orchestration module 102 may utilize the machine learning matrix 106 to recognize one or more terms in JSON fields of input data, train a model with the ontology of terms associated with the JSON fields of input data, produce a confidence score associated with the comparison of the ontology of terms to a similarity search of a LLM mapping, and indicate an unsuccessful mapping via an error/feedback process, where the indication optimizes the training of the model with additional mapping information.

In some embodiments, the data output module 122 (not shown) may output the identification of the data ontology. In some embodiments, the data output module 122 may output the request for the data communication between the external entity 112 and the internal enterprise system 110 via the orchestration layer 102. In some embodiments, the data output module 122 may output a dynamic comparison between the data ontology stored within the data warehouse 104 and the result of the machine learning matrix 106. In some embodiments, the data output module 122 may output the standardized data ontology based on the plurality of protocols. In some embodiments, the data output module 122 may the verification of the plurality of protocols associated with the standardized data ontology. In some embodiments, the data output module 122 may generate a standardized API between the external entity 112 and the internal enterprise system 110 based on the plurality of protocols.

Figure 2:
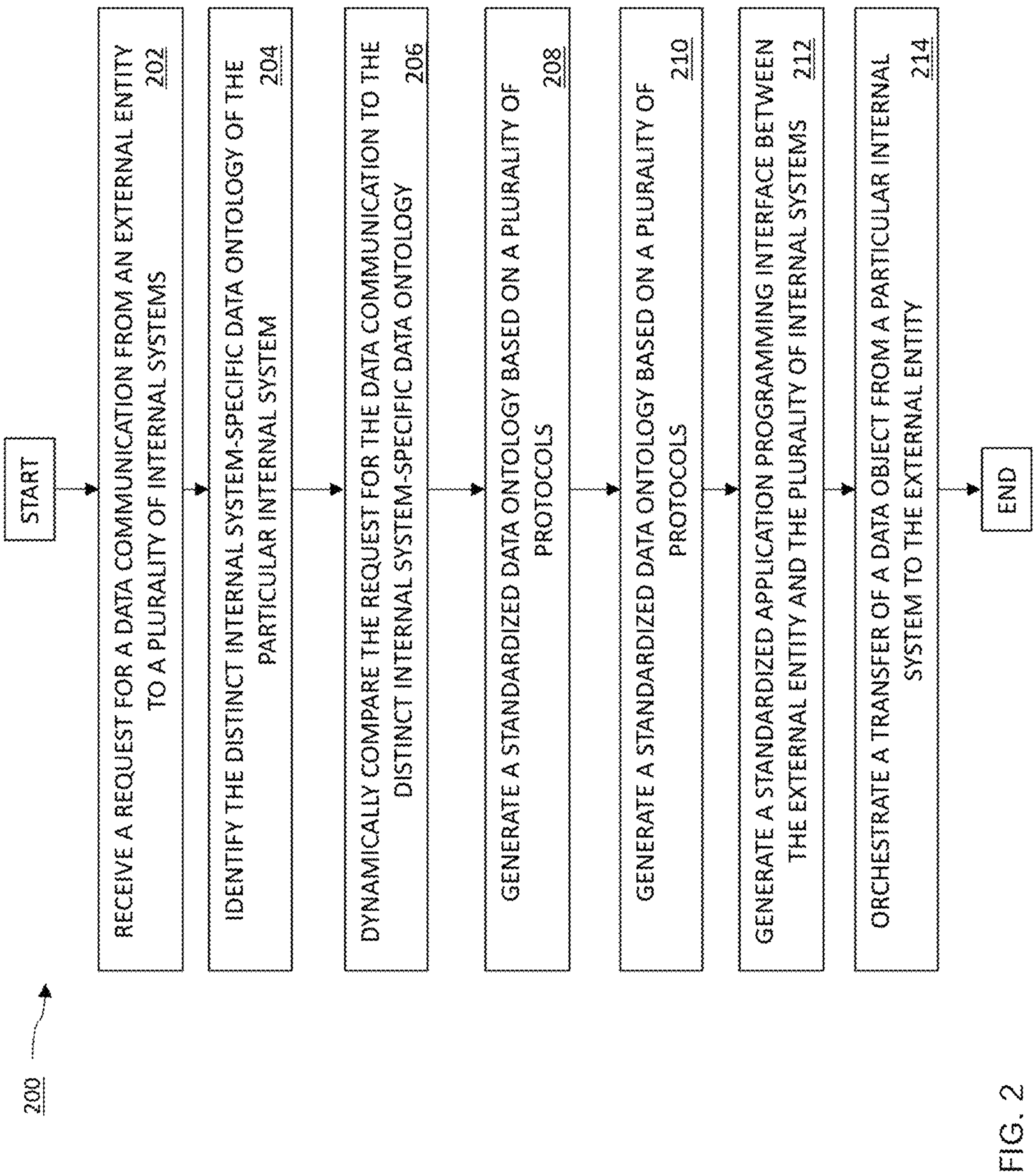
FIG. 2 is a flowchart illustrating operational steps for orchestrating a transfer of a data object from a particular internal enterprise system to the external entity via a standardized application programming interface, in accordance with one or more embodiments of the present disclosure.

FIG. 2 is a flowchart 200 illustrating operational steps for orchestrating a transfer of a data object 114 from a particular internal enterprise system 110 to the external entity 112 via a standardized application programming interface, in accordance with one or more embodiments of the present disclosure.

In some embodiments, at least one processor of a computing device may perform the following steps, where the steps respectively correlate with 202-214 of FIG. 2. In step 202, the orchestration module 102 of the exemplary enterprise system 100 receives a request for a data communication from the external entity 112 to a plurality of internal enterprise systems 110, where some or all internal enterprise systems may employ distinct internal system-specific data ontologies. In step 204, the orchestration module 102 identifies the distinct internal system-specific data ontology of a particular internal enterprise system 110. In step 206, the orchestration module 102 utilizes a machine learning matrix 106 to dynamically compare the request for the data communication to the distinct internal system-specific data ontology. In step 208, the orchestration module 102 generates a standardized data ontology based on a plurality of protocols associated with a result of the machine learning matrix 106. In step 210, the orchestration module 102 verifies the plurality of protocols associated with the standardized data ontology. In step 212, the orchestration module 102 generates a standardized application programming interface between the external entity 112 and the plurality of internal enterprise systems 110 based on the plurality of protocols and the result of the machine learning matrix 106. In step 214, the orchestration module 102 utilizes an adapter 108 to orchestrate a transfer of a data object 114 from a particular internal enterprise system 110 to the external entity 112 via the standardized application programming interface.

In some embodiments, the plurality of protocols associated with the standardized data ontology may include a plurality of requirements needed connect the external entity 112 with the plurality of internal enterprise system 110. In some embodiments, the verification of the plurality of protocols may refer to ensuring a number of shared requirements from the particular internal enterprise system 110 meet and/or exceed a predetermined threshold of similarity.

In some embodiments, the orchestration module 102 may generate a notification detailing the transfer of the data object 114 from the internal enterprise system 110 to the external entity 112. In some embodiments, the orchestration module 102 may utilize a notification hub to generate the notification providing the one or more artifacts associates with the transferrable data object 114. In certain embodiments, the orchestration module 102 may provide a plurality of continuous notifications that inform the external entity 112 of one or more modifications to the standardized data ontology via a message-streaming component. In some embodiments, the orchestration module 102 may utilize an illustrative data translation layer to digitally trace the plurality of continuous notifications outputted by the notification hub and implement a plurality of data control associated with the internal enterprise system 110. In some embodiments, the orchestration module 102 may periodically update the standardized data ontology using a middleware layer that limits subsequent testing requiring for subsequent modification of the standardized data ontology. In certain embodiments, the machine learning matrix 106 can perform steps 202-214 of FIG. 2.

Figure 3:
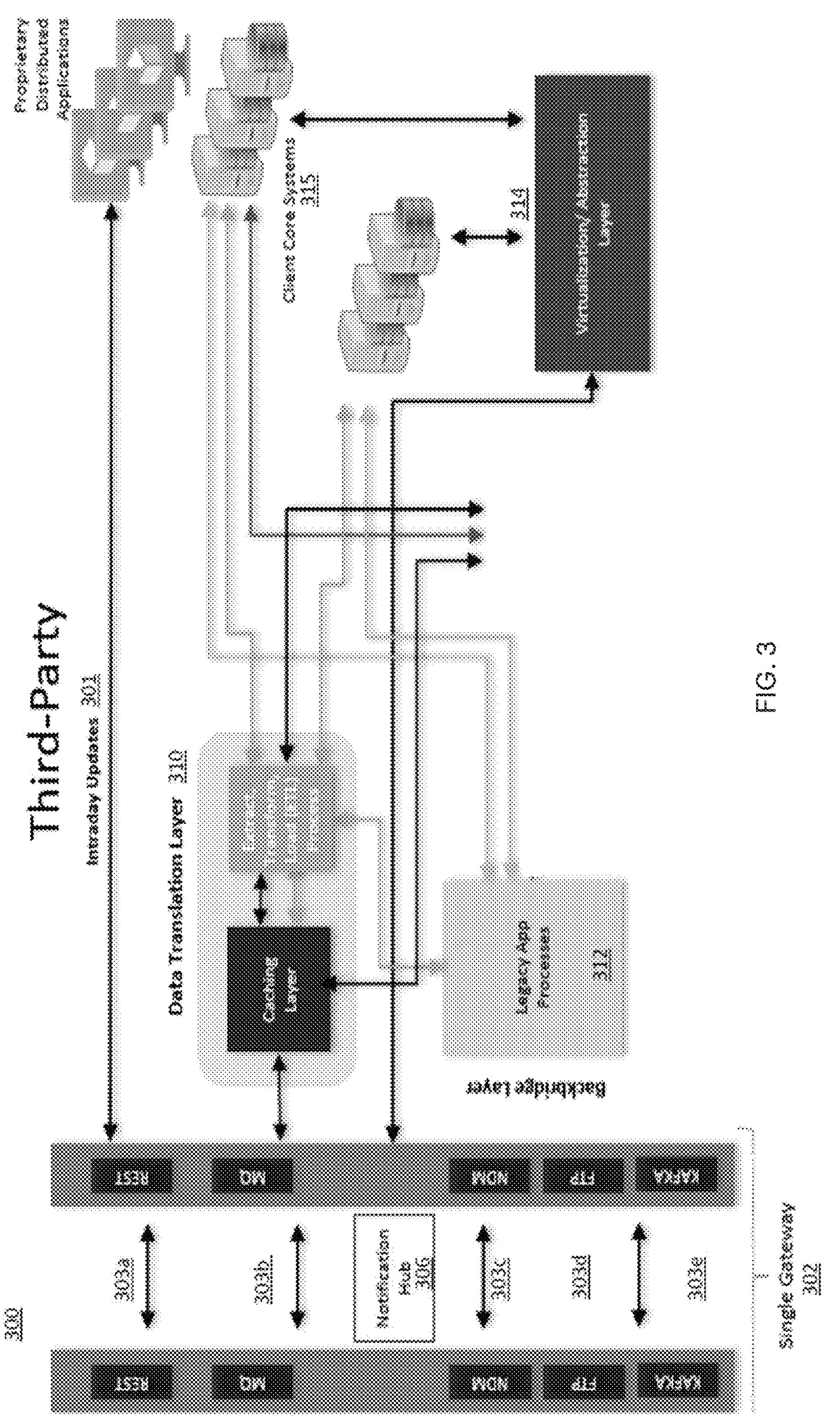
FIG. 3 depicts a schematic of an orchestration module between an external entity and a plurality of internal enterprise systems, in accordance with one or more embodiments of the present disclosure.

FIG. 3 depicts a schematic 300 of an orchestration module 102 between an external entity 112 and a plurality of internal enterprise systems, in accordance with one or more embodiments of the present disclosure.

In some embodiments, a single data gateway tool 302 may provide a single definition of data across a plurality of systems and may serve as a gateway to access multiple data services 303 in an orchestrated way. In certain embodiments, the multiple data services 303 may include, but not limited to, resting time service 303*a*, message quality 303*b*, network data mover 303*c*, file transfer protocol 303*d*, and translation service 303*e*, where the translation service 303*e* may refer to a service capable of building real-time data pipelines and applications that adapt to data streams. In some embodiments, an API management module 304 via an aggregation layer 305 may leverage API capabilities to address security, monitor and manage traffic, provide analytics and ensure consistency between multiple API implementations and versions. In certain embodiments, the aggregation layer 305 may utilize the API management module 304 to address security via a caching layer 307, where the caching layer 307 communicates with a security instrument layer 309*a*, a client, account, and relationship layer 309*b*, a product master layer 309*c*, a data object request layer 309*d*, a settlement layer 309*e*. In certain embodiments, the aggregation layer 305 may utilize the API management module 304 to provide analytics via a data aggregation layer 311, where the data aggregation layer 311 communicates with a performance layer 309*f*, a billing layer 309*g*, a cash treasury management layer 309*h*, and a corporate action layer 309*i*. In certain embodiments, the API management module 304 may refer to a core bookkeeping system associated with the orchestration module 102. In some embodiments, the notification hub 306 may identify all associated data types and locations for the event including discrete artifacts associated to exceptions resulting from a plurality of data interactions. In some embodiments, the orchestration module 102 may provide a plurality of continuous notifications that inform at least one entity of a plurality of entities of changes to critical data via an artifact transfer message-streaming component 308. In some embodiments, a data translation layer 310 may digitally trace messages and implement a plurality of data controls. In certain embodiments, the data translation layer 310 may utilize the caching layer 307 and an extract transform load process layer 313 to digitally trace the messages and implement the data controls. In some embodiments, the middleware layer 312 may limit the development and testing required for staying applications by providing like-for-like datasets and services as currently received. In some embodiments, the output of the notification hub 306 may flow into an abstraction layer 314 that may further communicate with a plurality of computing devices, where the plurality of computing devices may refer to a client core system 315.

Figure 4:
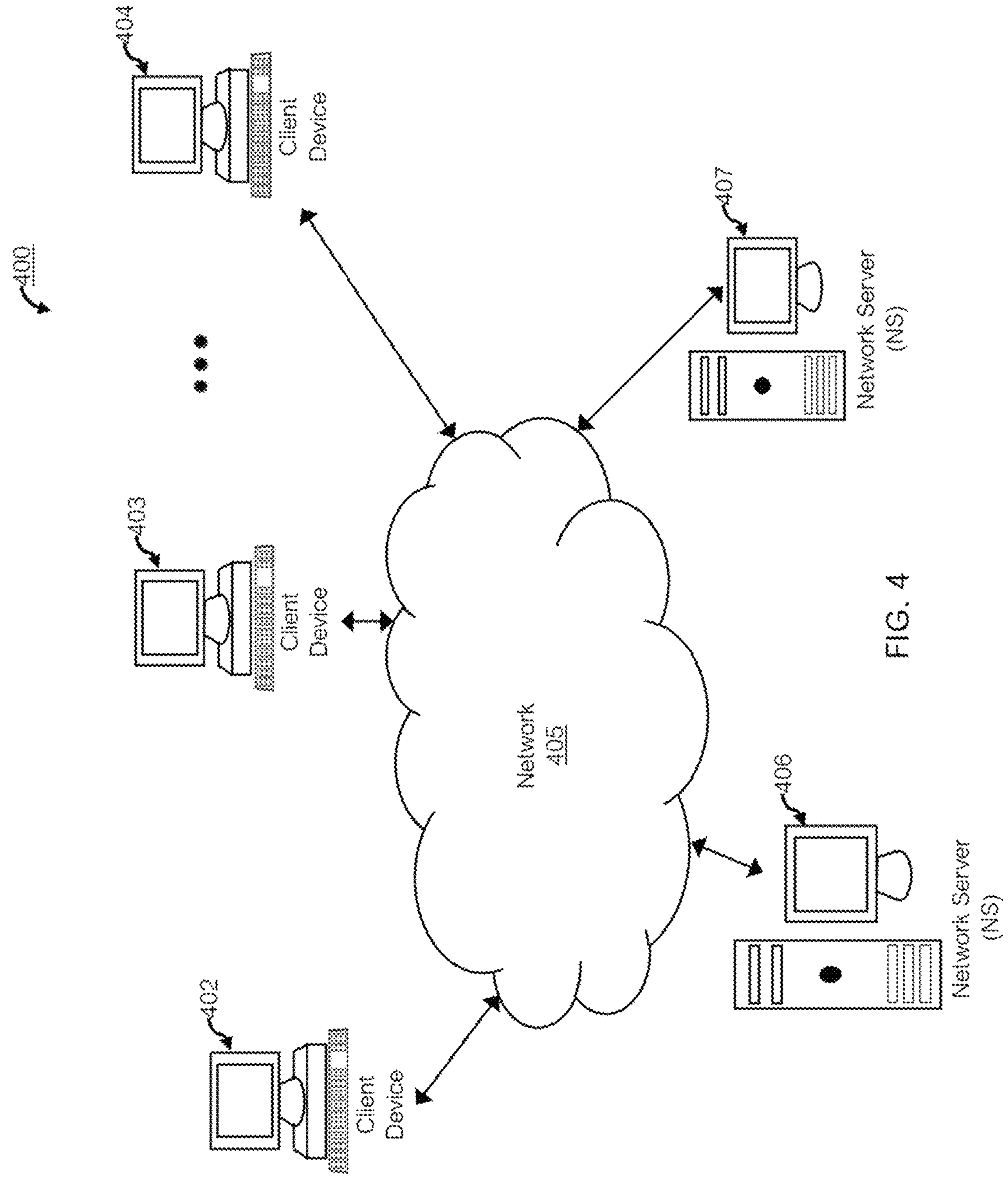
FIG. 4 depicts a block diagram of exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically modifying the interaction session to orchestrate a transfer of at least one artifact of the set of artifacts between the at least two entities, as detailed herein.

In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to remotely execute the instructions associated with the exemplary orchestration module 102 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of utilizing the exemplary orchestration module 118 to utilize an adapter 108 to orchestrate a transfer of data object 114 between an external entity 112 and a plurality of internal enterprise systems 110 via a network (e.g., cloud network), such as network 405, to and from another computing device, such as servers 406 and 407, each other, and the like. In some embodiments, the member devices 402-404 may be smart phones, personal computers, multiprocessor systems, microprocessor-based or programmable consumer electronics, network PCs, and the like. In some embodiments, one or more member devices within member devices 402-404 may include computing devices that connect using a wireless communications medium such as smart phones, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a laptop, tablet, desktop computer, a netbook, a smart phone, an ultra-mobile personal computer (UMPC), and/or any other device that is equipped to communicate over a wired and/or wireless communication medium. In some embodiments, one or more member devices within member devices 402-404 may include may launch one or more applications. In some embodiments, one or more member devices within member devices 402-404 may be configured to receive and to send web pages, and the like. In some embodiments, the exemplary orchestration module 102 of the present disclosure may be configured to generate a standardized data ontology and a standardized application programming interface between the external entity 112 and the plurality of internal enterprise systems 110 and employ virtually any web-based language. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards. In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, at least one computer network communication over the exemplary network 405 may be transmitted based at least in part on one of more communication modes. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to orchestrate a transfer of the data object

114 via the standardized application programming interface between the external entity 112 and the plurality of internal enterprise systems 110.

Figure 5:
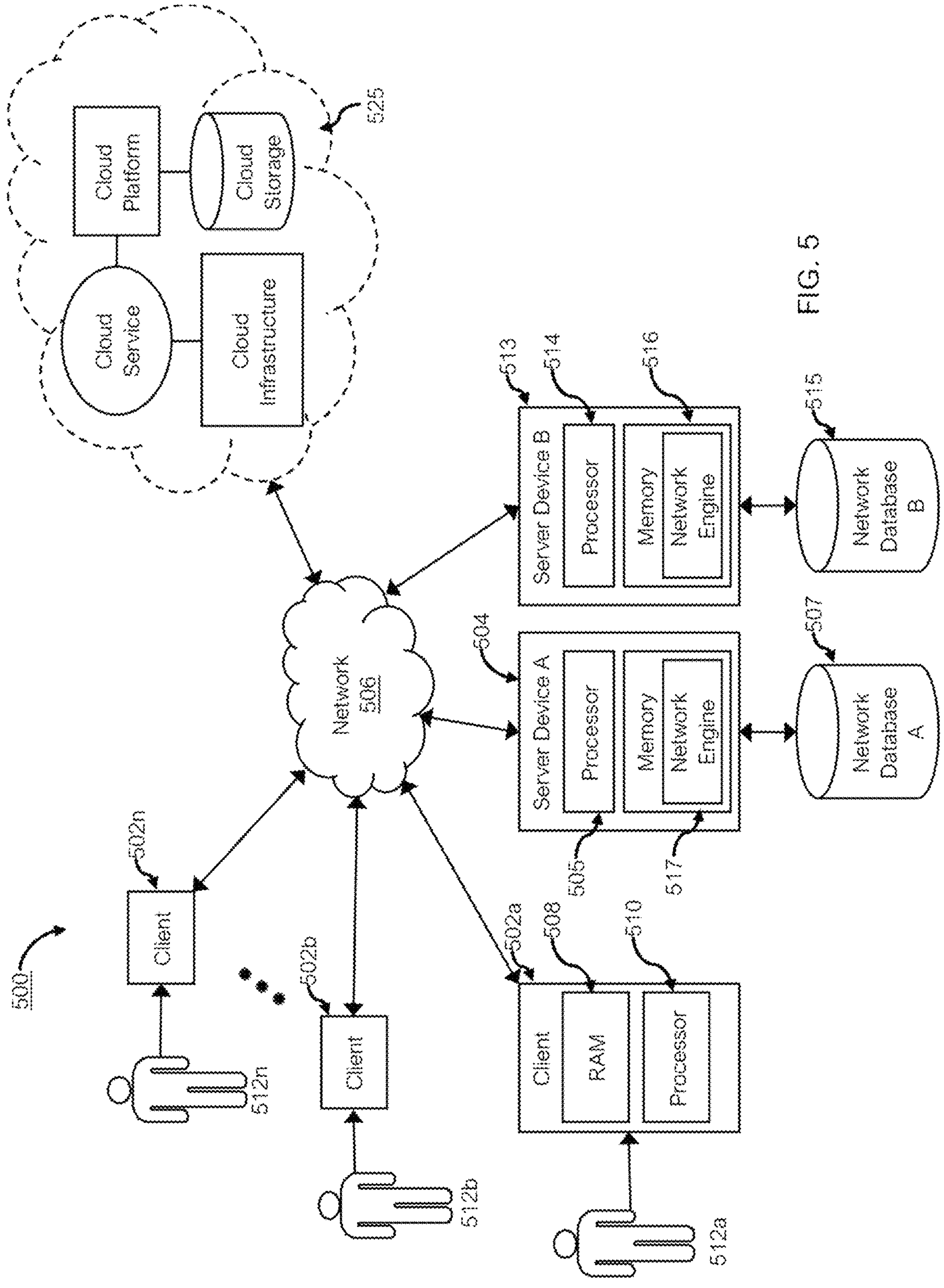
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. Also, various other forms of computer-readable media may transmit or carry instructions to a computer, including a router, private or public network, or other transmission device or channel, both wired and wireless.

In some embodiments, member computing devices 502*a* through 502*n* may also comprise a number of external or internal devices. In some embodiments, examples of member computing devices 502*a* through 502*n* (e.g., clients) may be any type of processor-based platforms that are connected to a network 506 such as, without limitation, personal computers, smart phones, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* shown may include, for example, personal computers executing a browser application program. In some embodiments, through the member computing client devices 502*a* through 502*n*, users, 512*a* through 512*n*, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502*a* through 502*n* may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
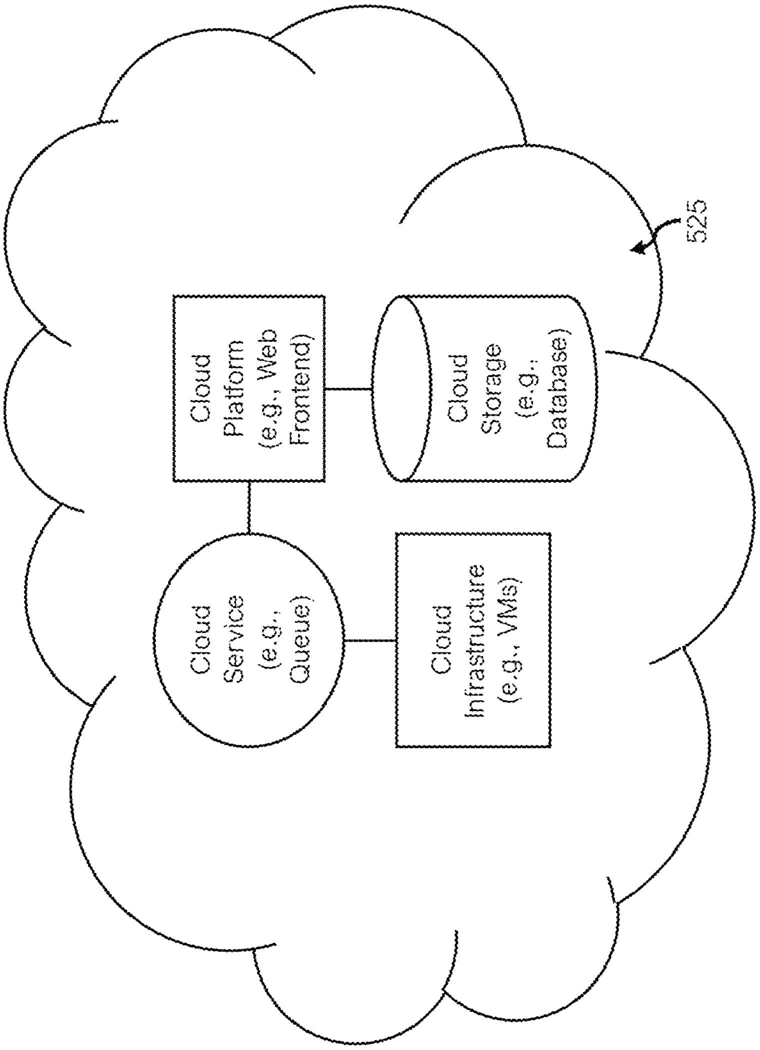
FIGS. 6 and 7 are diagrams illustrating implementations of cloud computing architecture/aspects with respect to which the disclosed technology may be specifically configured to operate, in accordance with one or more embodiments of the present disclosure.
Figure 7:
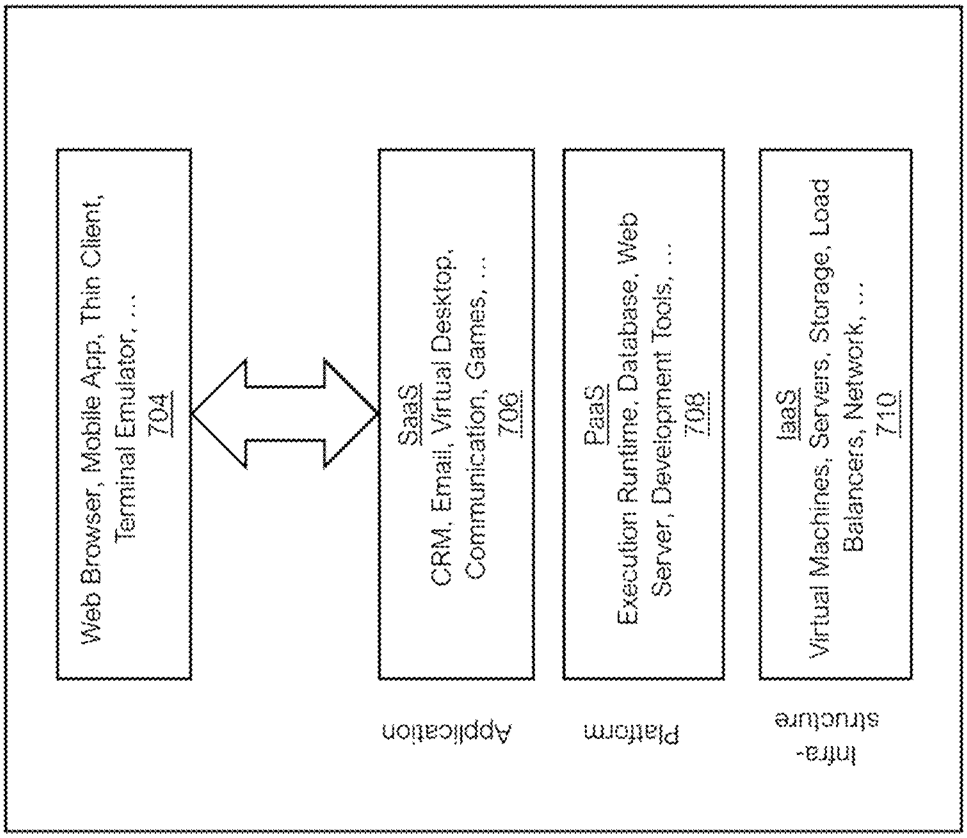

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages.

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999, 999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality. For example, a mobile electronic device can include, but is not limited to, a mobile phone, Personal Digital Assistant (PDA), or any other reasonable mobile electronic device.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method, comprising:

receiving, by at least one processor, a request for data communication from an external entity to a particular internal enterprise system of a plurality of internal enterprise systems, each internal enterprise system of the plurality of internal enterprise systems being associated with a respective distinct internal system-specific data ontology;

identifying, by the at least one processor, the distinct internal system-specific data ontology associated with the particular internal enterprise system;

utilizing, by the at least one processor, a machine learning matrix to dynamically compare the request for the data communication to the distinct internal system-specific data ontology, wherein the machine learning matrix parses the request to identify one or more requested data elements and one or more communication parameters, wherein the machine learning matrix generates one or more comparison scores based on a determination between the request and the data communication;

generating, by the at least one processor, a standardized data ontology based on a plurality of protocols associated with a result of the machine learning matrix, wherein the result comprises a comparison score meeting a predetermined threshold, wherein the plurality of protocols associated with the standardized data ontology comprise requirements to connect the external entity with the particular internal enterprise system;

verifying, by the at least one processor, the plurality of protocols associated with the standardized data ontology, wherein verifying comprises ensuring that a number of shared requirements from the particular internal enterprise system exceed a predetermined threshold;

generating, by the at least one processor, a standardized application programming interface between the external entity and the particular internal enterprise system based on the plurality of protocols and the result of the machine learning matrix;

utilizing, by the at least one processor, an adapter to orchestrate a transfer of a data object from the particular internal enterprise system to the external entity via the standardized application programming interface; and wherein the utilizing the adapter to orchestrate the transfer of the data object comprises transforming the data object according to the standardized data ontology prior to transmitting the data object to the external entity via the standardized application programming interface.

2. The computer-implemented method of claim 1, wherein identifying the distinct internal system-specific data ontology comprises retrieving the distinct internal system-specific data ontology from a data warehouse accessible to an orchestration module.

3. The computer-implemented method of claim 1, wherein the request for data communication comprises a request specifying at least one data field, and wherein utilizing the machine learning matrix comprises determining, for the at least one data field, a correspondence to at least one term of the distinct internal system-specific data ontology.

4. The computer-implemented method of claim 1, wherein generating the standardized data ontology comprises merging a historical data ontology associated with prior communications between the external entity and the particular internal enterprise system with a current data ontology associated with the particular internal enterprise system.

5. The computer-implemented method of claim 4, wherein generating the standardized data ontology further comprises filtering at least one rule or protocol that fails to match between the historical data ontology and the current data ontology.

6. The computer-implemented method of claim 1, wherein verifying the plurality of protocols comprises computing a similarity value for each of a plurality of parameters associated with the shared requirements and aggregating the similarity values to generate an aggregated similarity score, and comparing the aggregated similarity score to the predetermined threshold.

7. The computer-implemented method of claim 1, wherein generating the standardized application programming interface comprises generating an application programming interface specification that includes at least one of an endpoint definition, a request schema, a response schema, or an authentication requirement based on the plurality of protocols.

8. The computer-implemented method of claim 1, further comprising generating a notification detailing the transfer of the data object, and transmitting the notification to the external entity.

9. The computer-implemented method of claim 1, wherein utilizing the machine learning matrix further comprises generating a confidence score associated with the dynamic comparison, and initiating an error process when the confidence score fails to satisfy a predetermined confidence threshold.

10. A system, comprising:
at least one processor; and
a non-transitory memory storing computer-executable instructions that, when executed by the at least one processor, cause the system to:
receive a request for data communication from an external entity to a particular internal enterprise system of a plurality of internal enterprise systems, each internal enterprise system of the plurality of internal enterprise systems being associated with a respective distinct internal system-specific data ontology;
identify the distinct internal system-specific data ontology associated with the particular internal enterprise system;
utilize a machine learning matrix to dynamically compare the request for the data communication to the distinct internal system-specific data ontology,
wherein the machine learning matrix parses the request to identify one or more requested data elements and one or more communication parameters,
wherein the machine learning matrix generates one or more comparison scores based on a determination between the request and the data communication;
generate a standardized data ontology based on a plurality of protocols associated with a result of the machine learning matrix,
wherein the result comprises a comparison score meeting a predetermined threshold,
wherein the plurality of protocols associated with the standardized data ontology comprise requirements to connect the external entity with the particular internal enterprise system;
verify the plurality of protocols associated with the standardized data ontology, wherein verifying comprises ensuring that a number of shared requirements from the particular internal enterprise system exceed a predetermined threshold;
generate a standardized application programming interface between the external entity and the particular internal enterprise system based on the plurality of protocols and the result of the machine learning matrix;
utilize an adapter to orchestrate a transfer of a data object from the particular internal enterprise system to the external entity via the standardized application programming interface; and
wherein the computer-executable instructions that cause the system to utilize the adapter to orchestrate the transfer of the data object comprise at least one computer-executable instruction that causes the system to transform the data object according to the standardized data ontology prior to transmitting the data object to the external entity via the standardized application programming interface.

11. The system of claim 10, further comprising a data warehouse storing at least the distinct internal system-specific data ontology, wherein the instructions to identify the distinct internal system-specific data ontology comprise instructions to query the data warehouse.

12. The system of claim 10, wherein the predetermined threshold is a similarity threshold, and wherein the instructions to verify comprise instructions to execute a similarity measurement algorithm configured to generate an aggregated similarity score from a plurality of similarity values corresponding to the shared requirements.

13. The system of claim 10, wherein the standardized application programming interface is generated via an application programming interface management module configured to apply at least one of security controls, traffic monitoring, or analytics associated with transfers via the standardized application programming interface.

14. The system of claim 10, wherein the instructions further cause the system to output continuous notifications that inform the external entity of at least one modification to the standardized data ontology via a message-streaming component.

15. The system of claim 14, wherein the instructions further cause the system to digitally trace at least one of the continuous notifications or the transfer of the data object via a data translation layer implementing a plurality of data controls.

16. The system of claim 10, wherein the instructions further cause the system to periodically update the standardized data ontology using a middleware layer configured to limit development and testing for subsequent modifications of the standardized data ontology.

17. A non-transitory computer-readable storage medium tangibly encoded with computer-executable instructions that, when executed by at least one processor, cause the at least one processor to perform operations comprising:
receiving a request for data communication from an external entity to a particular internal enterprise system of a plurality of internal enterprise systems, each internal enterprise system of the plurality of internal enterprise systems being associated with a respective distinct internal system-specific data ontology;
identifying the distinct internal system-specific data ontology associated with the particular internal enterprise system;
utilizing a machine learning matrix to dynamically compare the request for the data communication to the distinct internal system-specific data ontology,
wherein the machine learning matrix parses the request to identify one or more requested data elements and one or more communication parameters,
wherein the machine learning matrix generates one or more comparison scores based on a determination between the request and the data communication;
generating a standardized data ontology based on a plurality of protocols associated with a result of the machine learning matrix,
wherein the plurality of protocols associated with the standardized data ontology comprise requirements to connect the external entity with the particular internal enterprise system;
verifying the plurality of protocols associated with the standardized data ontology,
wherein the result comprises a comparison score meeting a predetermined threshold, wherein verifying comprises ensuring that a number of shared requirements from the particular internal enterprise system exceed a predetermined threshold;

generating a standardized application programming interface between the external entity and the particular internal enterprise system based on the plurality of protocols and the result of the machine learning matrix;

utilizing an adapter to orchestrate a transfer of a data object from the particular internal enterprise system to the external entity via the standardized application programming interface; and wherein the utilizing the adapter to orchestrate the transfer of the data object comprises transforming the data object according to the standardized data ontology prior to transmitting the data object to the external entity via the standardized application programming interface.

18. The non-transitory computer-readable storage medium of claim 17, wherein utilizing the machine learning matrix comprises calculating a confidence score for a comparison between at least one similarity search result and a large language model-based mapping of a plurality of values based on the standardized data ontology.

19. The non-transitory computer-readable storage medium of claim 18, wherein the operations further comprise, responsive to the confidence score failing to satisfy a predetermined confidence threshold, generating feedback indicative of an unsuccessful mapping and updating at least one model based on the feedback to enhance the standardized data ontology with additional mapping information.

* * * * *